United States Patent
Hera et al.

(10) Patent No.: US 10,200,540 B1
(45) Date of Patent: Feb. 5, 2019

(54) EFFICIENT REUTILIZATION OF ACOUSTIC ECHO CANCELER CHANNELS

(71) Applicant: BOSE CORPORATION, Framingham, MA (US)

(72) Inventors: Cristian M. Hera, Lancaster, MA (US); Vigneish Kathavarayan, Marlborough, MA (US); Jeffery R. Vautin, Worcester, MA (US); Elie Bou Daher, Marlborough, MA (US); Paraskevas Argyropoulos, Everett, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/667,988

(22) Filed: Aug. 3, 2017

(51) Int. Cl.
*H04M 9/08* (2006.01)
*H04B 3/23* (2006.01)
*H04B 1/3822* (2015.01)

(52) U.S. Cl.
CPC .......... *H04M 9/082* (2013.01); *H04B 1/3822* (2013.01); *H04B 3/23* (2013.01)

(58) Field of Classification Search
CPC .... H04M 9/082; H04R 1/2884; G01S 3/8006; H04N 7/15
USPC ........ 379/406.08, 406.01, 406.03; 381/1, 17, 381/18, 23, 66, 86, 300, 307; 463/35; 704/500, 226; 709/204; 725/80
See application file for complete search history.

(56) References Cited

U.S. PATENT DOCUMENTS

| | | | | |
|---|---|---|---|---|
| 5,671,287 A | * | 9/1997 | Gerzon | H04S 5/00 381/1 |
| 7,310,425 B1 | * | 12/2007 | Benesty | H04M 9/082 379/406.08 |
| 8,295,493 B2 | * | 10/2012 | Faller | H04S 5/00 381/1 |
| 9,832,569 B1 | | 11/2017 | Ayrapetian et al. | |
| 2005/0213747 A1 | * | 9/2005 | Popovich | H04M 9/08 379/406.03 |
| 2007/0019803 A1 | * | 1/2007 | Merks | H04M 9/082 379/406.08 |
| 2007/0076891 A1 | * | 4/2007 | Cho | G10H 1/0091 381/1 |
| 2008/0031467 A1 | | 2/2008 | Haulick et al. | |

(Continued)

FOREIGN PATENT DOCUMENTS

JP 2011166484 A 8/2011

OTHER PUBLICATIONS

Bendat et al., "Random Data Analysis and Measurement Procedures", Wiley (2010), Chapter 7, section 7.1, pp. 201-206.

(Continued)

*Primary Examiner* — Gerald Gauthier
(74) *Attorney, Agent, or Firm* — Lando & Anastasi, LLP (57) ABSTRACT

Audio systems and methods are provided to reduce echo content in an audio signal. The systems and methods receive an audio signal and sound stage rendering parameter(s), and select a set of filter coefficients to filter the audio signal to provide an estimated echo signal. The estimated echo signal is subtracted from a microphone signal to provide an output signal with reduced echo content. The set of filter coefficients are selected based upon the sound stage rendering parameter(s) from among a plurality of stored sets of filter coefficients.

20 Claims, 3 Drawing Sheets

(56) References Cited

U.S. PATENT DOCUMENTS

| | | | | |
|---|---|---|---|---|
| 2008/0273714 | A1* | 11/2008 | Hartung | H04R 5/02 381/86 |
| 2009/0147975 | A1* | 6/2009 | Horbach | H04S 7/302 381/307 |
| 2009/0304198 | A1* | 12/2009 | Herre | G10L 19/008 381/66 |
| 2010/0046762 | A1* | 2/2010 | Henn | G10L 21/038 381/23 |
| 2010/0074432 | A1 | 3/2010 | Adeney | |
| 2010/0074433 | A1* | 3/2010 | Zhang | H04M 9/082 379/406.08 |
| 2010/0150376 | A1 | 6/2010 | Itou | |
| 2011/0081024 | A1* | 4/2011 | Soulodre | G01S 3/8006 381/17 |
| 2011/0135105 | A1 | 6/2011 | Yano | |
| 2011/0178798 | A1* | 7/2011 | Flaks | G10L 21/0208 704/226 |
| 2012/0040757 | A1* | 2/2012 | Page | H04R 5/02 463/35 |
| 2012/0093348 | A1* | 4/2012 | Li | H04S 3/002 381/300 |
| 2013/0304480 | A1* | 11/2013 | Kuntz | G10L 19/167 704/500 |
| 2015/0215722 | A1* | 7/2015 | Milne | H04S 7/305 381/300 |
| 2016/0309119 | A1* | 10/2016 | Lasser | H04N 7/147 |
| 2017/0006373 | A1* | 1/2017 | Bruss | H04R 1/1075 |

OTHER PUBLICATIONS

Hansler et al., "Acoustic Echo and Noise Control: A Practical Approach", Wiley & Sons (2004), Chapter 10, section 10.2, pp. 244-247.

Beaugeant et al., "New optimal filtering approaches for hands-free telecommunication terminals", Signal Processing (1998), pp. 33-47.

Le Bouquin Jeannès et al., "Combined Noise and Echo Reduction in Hands-Free Systems: A Survey", IEEE Transactions on Speech and Audio Processing (Nov. 2001), vol. 9, pp. 808-820.

Ochiai et al., "Echo Canceller with Two Echo Path Models", IEEE Transaction on Communications (1977), pp. 589-595.

Doclo et al., "Combined acoustic echo and noise reduction using GSVD-based optimal filtering", 2000 IEEE International Conference on Acoustics, Speech, and Signal Processing. Proceedings (Cat. No. 00CH37100), vol. 2, pp. II1061-II1064. doi: 10.1109/ICASSP.2000.859146. Retrieved from <https://pdfs.semanticscholar.org/1784/8d74d9049f759e9eb4b0822201eb3bd9da07.pdf>.

Emura et al. "A Method for Posterior Frequency-Domain Multi-Channel Residual Echo Canceling", IEEE International Conference on Acoustics, Speech and Signal Processing (2011), pp. 421-424.

Emura, S. "Residual Echo Reduction for Multichannel Acoustic Echo Cancelers With a Complex-Valued Residual Echo Estimate", IEEE/ACM Transactions on Audio, Speech, and Language Processing (2018) vol. 26, No. 3, pp. 485-500.

International Search Report and Written Opinion from International Application No. PCT/US2018/044765 dated Sep. 26, 2018.

International Search Report and Written Opinion from International Application No. PCT/US2018/044762 dated Oct. 30, 2018.

* cited by examiner

EFFICIENT REUTILIZATION OF ACOUSTIC ECHO CANCELER CHANNELS

CROSS REFERENCE TO RELATED APPLICATIONS

This application is related to U.S. patent application Ser. No. 15/668,073 titled MULTI-CHANNEL RESIDUAL ECHO SUPPRESSION filed on Aug. 3, 2017, and to U.S. patent application Ser. No. 15/668,237 titled MITIGATING IMPACT OF DOUBLE TALK FOR RESIDUAL ECHO SUPPRESSORS filed on Aug. 3, 2017, each of which is incorporated herein by reference in its entirety for all purposes.

TECHNICAL FIELD

Aspects and examples of the present disclosure are directed generally to voice and audio systems and methods, and in some examples, more specifically to systems and methods for removing acoustic echo signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some such audio systems include one or more microphones intended to pick up a user's voice for certain applications, such as the near end of a telephone call or for commands to a virtual personal assistant. The acoustic signals produced by the audio system also contribute to the microphone signals, and may undesirably interfere with processing the user's voice signal.

SUMMARY

Aspects and examples are directed to audio systems and methods that make efficient use of echo cancelers, to reduce echo content in an audio signal, by storing filter coefficients associated with particular sound stage configurations. The audio systems and methods select from among the stored filter coefficients and load them into one or more echo cancelation filters when the particular (or similar) sound stage configuration is selected for operation.

According to one aspect, a method of reducing echo content of an audio signal is provided and includes receiving an audio program content signal, receiving a sound stage rendering parameter, selecting a set of filter coefficients from among a plurality of stored sets of filter coefficients based upon the sound stage rendering parameter, filtering the audio program content signal using the selected set of filter coefficients to generate a filtered signal, receiving a microphone signal configured to include a signal component representative of an echo of the audio program content signal, and subtracting the filtered signal from the microphone signal to generate an output audio signal.

Some examples include loading the selected set of filter coefficients to an audio filter and activating the audio filter to perform the filtering. Some examples include loading the selected set of filter coefficients to an adaptive filter, adapting the adaptive filter coefficients, and copying the adaptive filter coefficients to an active audio filter that performs the filtering.

Some examples include loading the selected set of filter coefficients to an adaptive filter that performs the filtering. Certain examples include detecting double-talk and disabling an adaptive component of the adaptive filter while double-talk is detected.

Some examples include rendering the audio program content signal into an acoustic signal, based upon the selected sound stage rendering parameter.

Certain examples include storing adapted filter coefficients and associating the stored filter coefficients with the sound stage rendering parameter.

Some examples include receiving a second sound stage rendering parameter, selecting a second set of filter coefficients based upon the second sound stage rendering parameter, and filtering the audio program content signal using the second selected set of filter coefficients to generate the filtered signal.

According to another aspect, an audio system is provided that includes an input to receive an audio content signal, a loudspeaker output configured to provide a processed version of the audio content signal to a loudspeaker for rendering an acoustic signal in accord with a selected sound stage configuration, a microphone input to receive a microphone signal having an echo component of the acoustic signal, from one or more microphones, an audio filter configured to filter the audio content signal according to a set of filter coefficients, the set of filter coefficients selected from among a plurality of sets of filter coefficients based upon the selected sound stage configuration, and a memory configured to store the plurality of sets of filter coefficients.

Some examples include a combiner configured to subtract the filtered audio content signal from the microphone signal to provide an output signal.

Some examples include a processor configured to select the selected set of filter coefficients and to copy the selected set of filter coefficients from the memory to the audio filter.

Some examples include an adaptive filter to filter the audio content signal according to the set of filter coefficients and to provide an updated set of filter coefficients.

Certain examples include a processing block configured to determine whether an updated set of filter coefficients performs better than the selected set of filter coefficients, and to copy the updated set of filter coefficients to at least one of the audio filter and the memory.

Some examples include a processing block configured to copy a set of filter coefficients from the audio filter to the memory and to associate the copied filter coefficients with the sound stage configuration.

Some examples include a processing block configured to select a second set of filter coefficients and to copy the second selected set of filter coefficients from the memory to the audio filter in response to a second selected sound stage configuration.

According to yet another aspect, a multi-channel audio system is provided that includes a sound stage processor having one or more outputs configured to provide processed signals, a plurality of content channels, each of the plurality of content channels configured to convey a selected audio content signal from a source to the sound stage processor, and a plurality of echo canceling filters, each of the echo canceling filters associated with one of the plurality of content channels, and each of the echo canceling filters configured to filter the associated selected audio content signal into an estimated echo signal using a set of filter coefficients selected from among a plurality of sets of filter coefficients, the selected set of filter coefficients based upon a selected sound stage configuration associated with the selected audio content signal.

Certain examples include one or more loudspeakers coupled to the one or more outputs to receive the processed signals and to produce acoustic signals responsive to the processed signals.

Certain examples include a microphone input to receive a microphone signal and a signal combiner configured to subtract the plurality of estimated echo signals from the microphone signal.

Certain examples include one or more microphones to receive acoustic signals and configured to provide at least one microphone signal from which the plurality of estimated echo signals is subtracted to produce an output signal.

Some examples include a memory to store the plurality of sets of filter coefficients.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Aspects of the present disclosure are directed to audio systems and methods that provide echo cancelation in a multi-channel environment. Aspects and examples disclosed herein achieve multi-channel echo cancelation using fewer acoustic echo cancelers than conventional systems and methods.

Audio systems, especially automotive audio systems, may produce acoustic signals in an environment, e.g., a vehicle compartment, for the benefit of people in the environment. The acoustic signals may be for entertainment, information, communication, and navigation, for example. Such audio systems may also accept acoustic input from the occupants, e.g., one or more people may verbally speak and their voices may be picked up by the audio system, e.g., via one or more microphones, for various purposes such as telephone conversations, verbal commands to a navigation system or a virtual personal assistant, and the like. When the audio system renders an acoustic signal, e.g., via a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. When multiple loudspeakers and/or multiple audio signal sources are used, there may be multiple acoustic echo cancelers involved.

The audio system may provide various signal processing, such as equalization and sound stage programming, to prepare an audio signal to be converted into an acoustic signal by, e.g., a loudspeaker, and acoustic echo cancelers may use various adaptive algorithms to estimate the echo created by the audio system processing, the loudspeaker, and the environment in which the system operates. Multiple loudspeakers, multiple audio signal sources, and multiple signal processing options (e.g., equalization, sound stage) conventionally require a number of acoustic echo cancelers, each of which works to estimate the echo of a particular channel combination of audio source and sound-stage options. Aspects and examples disclosed herein reduce the number of acoustic echo cancelers required, at least in part by resetting and/or re-loading individual echo cancelers with previously determined and stored filter coefficients based upon a selected combination of audio source and sound-stage options.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
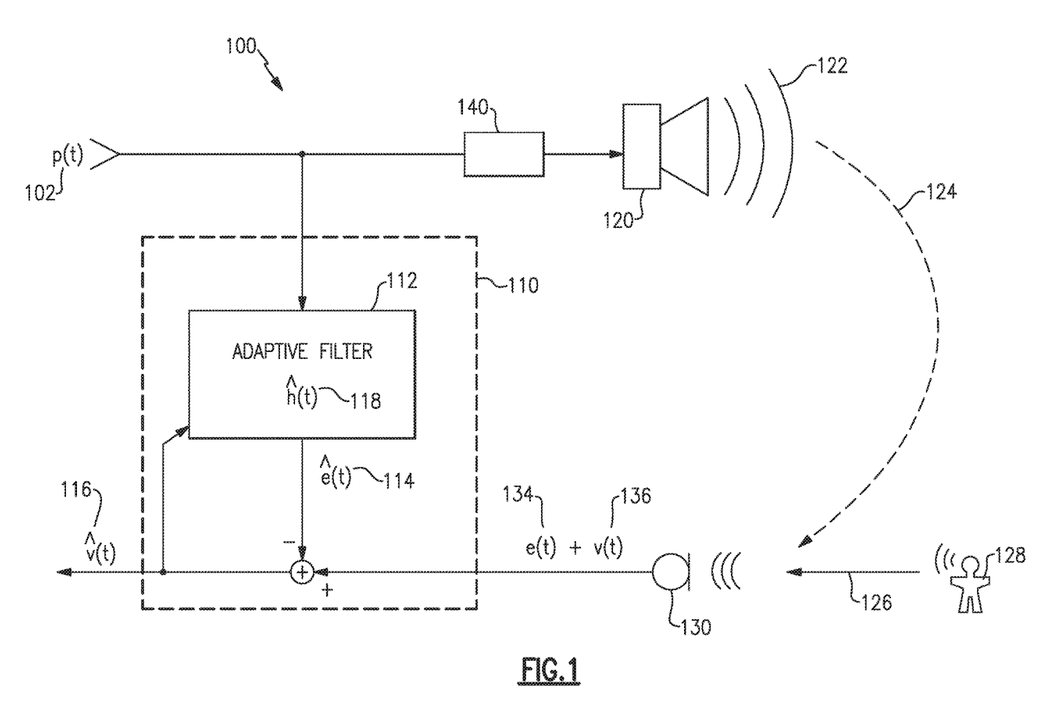
FIG. 1 is a schematic diagram of an example audio system including echo cancelation.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, $\hat{v}(t)$. The echo canceler 110 works to remove the echo signal 134 by processing the program content signal 102 through a filter 112 to produce an estimated echo signal 114, $\hat{e}(t)$, which is subtracted from the signal provided by the microphone 130.

For example, the acoustic program signal 122 causes the echo signal 134. If the filter 112 performs well at providing an estimated echo signal 114, it will perform well at removing the echo signal 134 from the signal provided by the microphone 130. As a result, the estimated voice signal 116, $\hat{v}(t)$, will be a good representation of the actual voice signal 136, v(t).

The echo canceler 110 may include an adaptive algorithm to update the filter 112, at intervals, to improve the estimated echo signal 114. Over time, the adaptive algorithm causes the filter 112 to converge on satisfactory parameters that produce a sufficiently accurate estimated echo signal 114. Generally, the adaptive algorithm updates the filter during times when the user 128 is not speaking, but in some examples the adaptive algorithm may make updates at any time. When the user 128 speaks, such is deemed "double talk," and the microphone 130 picks up both the acoustic echo signal 124 and the acoustic voice signal 126. Regarding the terminology, the user 128 is "talking" at the same time as one or more acoustic drivers 120 are producing acoustic program content, or "talking," hence, "double talk."

The filter 112 may apply a set of filter coefficients to the program content signal 102 to produce the estimated echo signal 114, $\hat{e}(t)$. The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, $\hat{h}(t)$, which is representative of the overall response of the processing 140, the acoustic driver(s) 120, the acoustic environment, and the microphone(s) 130, to the program content signal 102. The transfer function is a representation of how the program content signal 102 is transformed from its received form into the echo signal 134.

Figure 2:
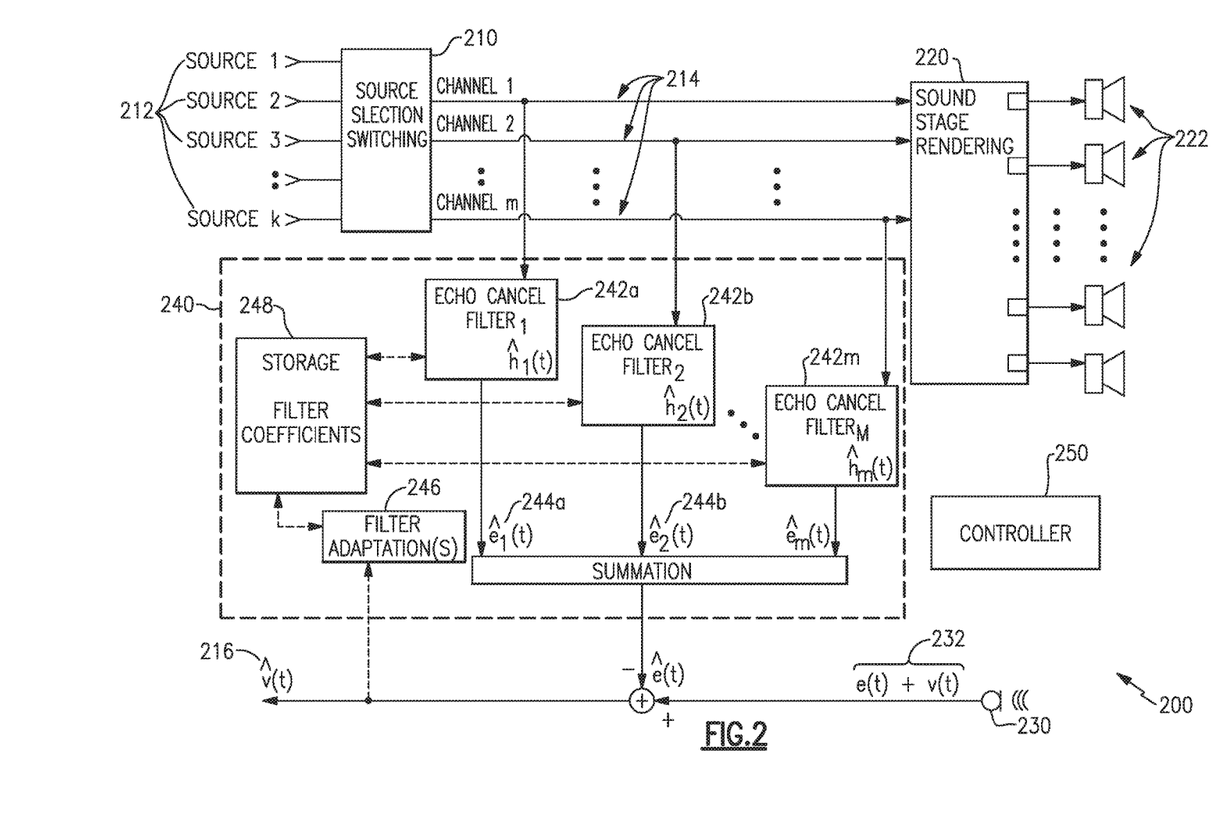
FIG. 2 is a schematic diagram of an example audio system including multi-channel echo cancelation.

FIG. 2 illustrates an example multi-channel audio system 200 that includes source selection switching 210 to allow selection from among multiple sources 212 to provide one or more program content signals for rendering as acoustic signals. The audio system 200 also includes a sound stage processor 220 to control a number of acoustic transducers 222, at least one microphone input and/or at least one microphone 230 to pick up acoustic signals in the environment, including user voices and audio system echoes, an echo cancelation subsystem 240 for estimating the echo signal content of the audio signal provided by the microphone 230, and a controller 250 to manage one or more components of the source selection switching 210, the sound stage processor 220, and/or the echo cancelation subsystem 240.

In some examples, the echo cancelation subsystem 240 may operate on signals or signal channels after processing by the sound stage processor 220, rather than prior to sound stage processing as shown in the figures. For example, the echo cancelation subsystem 240 may operate on signals provided directly to the acoustic transducers 222, before or after amplification. In other examples, there may be various signal processing before, after, or both before and after the provision of such signals to the echo cancelation subsystem 240.

In some examples, the microphone 230 may be an array of microphones, having array processing to steer beams toward sources of desired acoustic signals and/or away from noise sources, and may additionally or alternately steer nulls toward noise sources. In such examples, the controller 250 may further control such array processing components, or such array processing components may be alternately controlled and/or may be pre-configured for various operating characteristics. In other examples, the microphone 230 may be a microphone input or other signal input suitable to receive an audio signal from a microphone, whether pre-processed, filtered, combined, etc.

Any of the sources 212 may include hardware for providing an audio signal, such as a radio tuner, navigation system, telephone system, and the like, or may include inputs to accept audio signals from an external device. For example, any of the sources 212 may include one or more physical electrical connections or wireless connections, or any combination of wired and wireless connections, and may include network interfaces to receive (and optionally to provide) various audio signals. Examples include audio jacks, such as 3.5 mm audio jacks, for example, Bluetooth® wireless interfaces and hardware, or the like, network interface jacks and/or connectors, such as an RJ-45 connector, for example, and wireless local area network (WLAN) interfaces and hardware, or any combination of these or other interfaces suitable for conveying audio signal content. Various of these or other interfaces may also include inputs to receive commands and control parameters, such as filter settings, equalization, volume control, or other sound stage parameters, etc.

The echo cancelation subsystem includes a number of echo cancelation filters 242, each of which is associated with a particular content channel 214. The content channels 214 provide content signals to the sound stage processor 220, from among the sources 212 (as selected by the source selection switching under the control of the controller 250). The sound stage processor 220 provides various processing, such as equalization and loudspeaker routing, to drive the acoustic transducers 222 to generate acoustic sound fields in accordance with the various program content signals and sound stage parameters.

The various sources 212 may provide audio content to be rendered within the environment, such as an interior occupant compartment of a vehicle, and may include numerous types of audio sources, such as radios, telephones, navigation systems, etc. Each of the sources 212 and each sub-channel provided by the sources 212 may have differing requirements for sound stage rendering, such as equalization settings and routing to various acoustic transducers 222 or groups of acoustics transducers 222.

Any of the sources 212 may have numerous sub-channels, such as left and right, front and rear, center, sub, or the like, and any of the sources 212 may have differing sub-channels based upon a mode of operation, such as a radio receiver may operate in different modes to receive audio content in a mono, stereo, or multi-channel surround format. Similarly, a video entertainment device may provide audio content in any of mono, stereo, surround, or other formats. Further, a video entertainment device may be selected to provide program content to be rendered in the rear of the vehicle while an audio entertainment device is selected to provide program content to be rendered in the front of the vehicle. At the same time, a telephone conversation may be selected to provide program content to be rendered acoustically near a passenger, and a navigation device may be selected to provide program content to be rendered acoustically near a driver. At any time, a warning system (e.g., lane drift, blind-spot detection, etc.) may provide content to be rendered at various locations.

As an example, a navigation system may use multiple sets of sound stage parameters to render announcements to come from various positions within the vehicle. For example, differing sound stage rendering parameters may produce an announcement "turn right" from the right side of the vehicle, and "turn left" from the left side of the vehicle, or a "continue ahead" announcement may come from the front center of the vehicle. In the first instance, the "turn right" may be routed to one or more acoustic transducers 222 so that the acoustic presentation sounds like it comes from the right side of the vehicle, and may include equalization appropriate for the particular acoustic transducers 222 to which it is routed. The "turn left" announcement may similarly be routed to one or more acoustic transducers 222 to sound like it comes from the left side of the vehicle, with appropriate equalization(s), and the "continue ahead" announcement may be routed to one or more acoustic transducers 222 so that a balanced acoustic signal is produced that sounds like it comes from a center position. Each of the acoustic transducers 222 may have its own equalization parameters, which may also vary based upon which of the sources 212 any particular audio signal originates. Further, each of the acoustic transducers 222 may have a limited frequency range. Additionally, a different equalization for a specific acoustic transducer 222 may be applied when that acoustic transducer 222 is grouped with other particular combinations of acoustic transducers 222, and so on.

As another example, each of a number of occupants may be listening to music at different volume levels, e.g., rendered by various acoustic transducers 222 in such manner to cause each occupant to hear a different volume level. At any time, one of the occupants may adjust his/her listening experience, such as by changing the volume or turning off the music altogether at his/her position. In some examples, each of the occupants may be able to listen to different music or audio sources at the same time.

As another example, while listening to music, an incoming telephone call may arrive and the driver may answer the telephone call. The audio system 200 may be configured to render the incoming audio of the telephone call so that the driver hears it well but the other occupants don't. Additionally, the sound system 200 may simultaneously cease or reduce the playback volume of other audio content at the driver's position. Further, the audio system 200 may allow the driver to "transfer" the call to a particular passenger, e.g., make a selection so that the sound stage processor 220 routes the incoming telephone audio to appropriate acoustic transducers 222, with appropriate equalization and/or playback volume, so that the selected passenger can hear it but it does not disturb the other occupants. Alternately, the driver may make a selection to have the telephone audio play for all the occupants to hear. Any other audio content currently playing may then be stopped by the audio system 200, or may have reduced playback volume. In some examples, the audio system 200 may accommodate multiple phones, for example via multiple Bluetooth® connections, and associate each phone with a particular occupant's position in a passenger compartment. An incoming telephone call may then be rendered by the audio system 200 to the particular passenger whose phone was called.

In accordance with all the above discussion and examples, the number of possible sound processing combinations and potential transitions may easily become substantial, even for an audio system having relatively few distinct audio sources.

Each of the above example program content sources 212 and sub-channels may have unique sound stage rendering 220 requirements at any given time, and every possible combination of source sub-channel and sound stage rendering parameters may exhibit a different transfer function from the source 212 to the microphone 230 where an echo of the source sub-channel may be received. Advantageously, not every combination will be in use at the same time, and audio systems and methods in accord with aspects and examples disclosed herein are capable of operation with a minimal number of echo canceler channels by adapting, storing, and loading sets of filter coefficients at appropriate times, and associating combinations of sources 212, sub-channels, and sound stage rendering parameters with stored filter coefficients.

With continued reference to FIG. 2, a particular example is described wherein a first source 212 may provide stereo (left and right) audio content to be rendered by the sound stage processor 220 through various of the acoustic transducers 222. In this example, two content channels 214 are used, a first content channel 214 to convey the left program content signal to the sound stage processor 220, and a second content channel 214 to convey the right program content signal to the sound stage processor 220. The sound stage processor may be programmed, controlled, or otherwise configured to produce (e.g., render) the left channel from the left of a vehicle (or other environment in which the audio system 200 is operated) and to produce the right channel from the right of the vehicle. A first echo cancelation filter 242a receives the left program content signal from the first content channel 214 and produces a first estimated echo signal 244a associated with the left of the vehicle. A second echo cancelation filter 242b receives the right program content signal from the second content channel 214 and produces a second estimated echo signal 244b associated with the right of the vehicle. In this example, no more program content is being rendered. Accordingly, no additional content channels 214 or echo cancelation filters 242 are used. The first and second estimated echo signals 214a, 214b are added together to produce a combined estimated echo signal. The combined estimated echo signal is subtracted from the microphone signal 232 to produce an estimated voice signal 216, similar to that described above with reference to FIG. 1. Adaptation of the first and second echo cancelation filters 242a, 242b may be carried out by one or more adaptation blocks 246, in a manner similar to the adaptive algorithm(s) described above with reference to FIG. 1. It should be understood the adaptation block 246 receives the various program content signals from the content channels 214, though for simplicity in FIG. 2 such is not explicitly illustrated.

Expanding upon the above example, while the first source 212 is providing left and right content on two content channels 214, respectively, a navigation system may be a second source 212 that may provide content to rendered to the left, to the right, or to the center, each with differing sound stage rendering parameters, as previously described. Rather than dedicate three additional content channels 214 and echo cancelation filters 242 to the second source 212, the audio system 200 is capable to take advantage of the fact that the navigation system will only use one of the left, right, or center sound stage combinations at any given time. Additionally, the navigation system may be idle for some time before a navigation announcement needs to be rendered by the sound stage processor. Accordingly, upon a signal from the navigation system that it has content to be rendered in accord with a particular set of sound stage parameters, the audio system 200 may allocate a single content channel 214 and a single echo cancelation filter 242 to the navigation system. The echo cancelation filter 242 to be allocated, however, has not been in operation until this point (in this example) and does not have an appropriate set of filter coefficients to cancel an echo component from the navigation system. Accordingly, the echo cancelation subsystem 240 includes storage 248 that contains an appropriate set of filter coefficients to cancel an echo component from the navigation system, for a given sound stage rendering configuration.

For example, upon the signal from the navigation system that it has content to be rendered in accord with a particular set of sound stage parameters, the controller 250 and/or the echo cancelation subsystem 240 may locate the appropriate set of filter coefficients to cancel an echo component from the navigation system for the given sound stage parameters. If the navigation system indicates that an announcement is to be acoustically rendered from the left, a previously stored set of filter coefficients is selected from the storage 248 and copied to the appropriate echo cancelation filter 242, and used to cancel (or reduce) echo content in the microphone signal 232 due to the left-rendered navigation announcement. While the navigation system is providing content to be left-rendered, the filter adaptation block 246 may operate to adapt (e.g., adjust) the filter coefficients, in the foreground or background as described previously. If the adaptation block 246 converges on new filter coefficients, the new filter coefficients may be copied into the storage 248 and associated with, e.g., left-rendered navigation announcements, for future use the next time the navigation system has an announcement to rendered in a similar manner.

In some cases, a user may adjust certain audio system controls, such as tone, balance, or others, that effect the transfer function between a source 212 and an echo component of a microphone signal 232. One advantage of the above example of operation of the audio system 200 is that filter coefficients stored in the storage 248 may be updated, e.g., by copying new filter coefficients determined by the adaptation block 246, either at intervals or at the end of use of one of the echo cancelation filters 242, or both. Additionally or alternately, certain user adjustment, such as tone or others, may be applied at various locations, such as before provision of the content signal to an echo cancelation filter 242, which may reduce the need for adaptation of filter coefficients when the user makes such adjustments.

Figure 3:
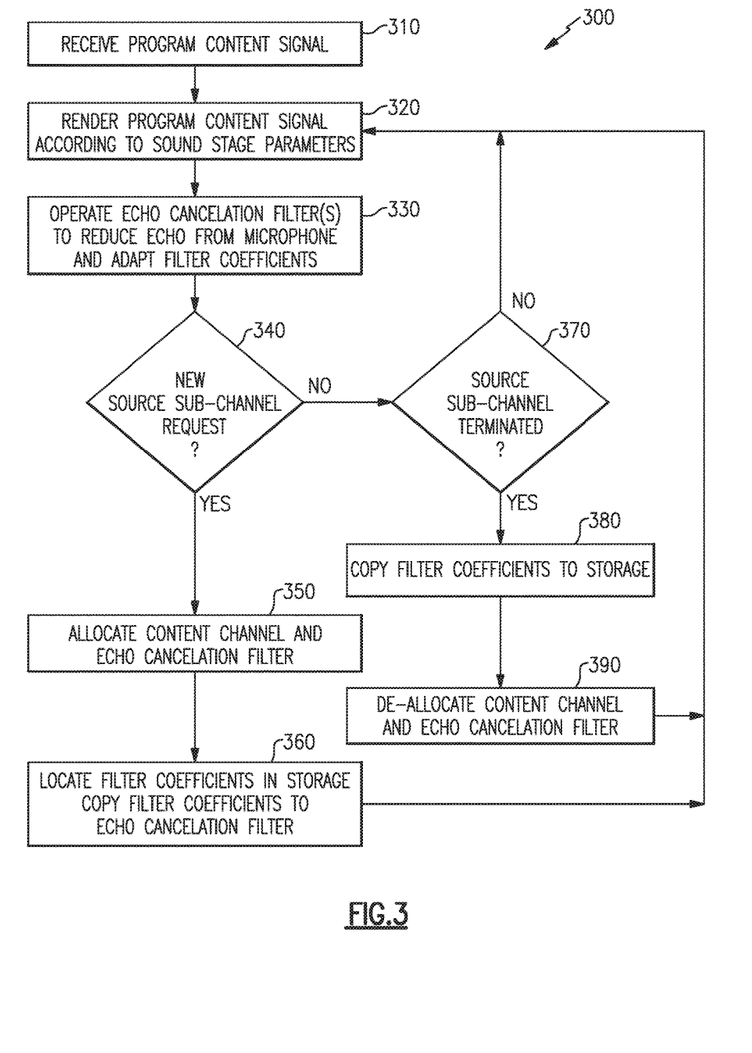
FIG. 3 is a flow diagram of an example method of controlling a multi-channel audio system.

FIG. 3 illustrates an example operational method 300 that may be performed by an audio system such as the audio system 200 of FIG. 2 to allow reallocation of echo cancelation filters to various combinations of content signals and sound stage rendering parameters, on demand, to thereby reduce the total number of echo cancelation filters needed in a particular system. The method 300 includes receiving one or more program content signals (block 310) and rendering the program content signals (block 320) according to one or more sound stage parameters, for example by the sound stage processor 220 via one or more acoustic transducers 222. At block 330, echo cancelation filters 242 are operated normally to reduce echo from a microphone signal and to adapt their filter coefficients. If a new source sub-channel is requested (block 340), the method 300 allocates a content channel 214 and an echo cancelation filter 242 to the new request (block 350), locates appropriate filter coefficients in storage 248 and copies the filter coefficients to the echo cancelation filter (block 360), and continues to render all requested program content material (block 320), including the new source sub-channel. Whenever a source sub-channel is no longer needed, e.g., terminated (block 370), filter coefficients may be copied (block 380) from the allocated echo cancelation filter 242 to the storage 248, the content channel 214 and the echo cancelation filter 242 are de-allocated (block 390), and rendering continues for any remaining program content channels (block 320).

A program content signal may have any suitable spectral range, such as, for example, 20 Hz to 20,000 Hz being an acoustic range typically accepted as matching that of the human ear. In some examples, however, removing an echo signal based upon the program content signal may be limited to a narrower spectrum. In certain examples, the microphone signal may be filtered to a narrower bandwidth because it may be intended to pick up human vocal activity, and may only require a lower frequency bound as low as, e.g., 60 Hz, and/or an upper frequency bound as high as, e.g., 8,000 Hz or 10,000 Hz, for example. In certain embodiments, the microphone signal may be filtered, controlled, or otherwise limited to a frequency spectrum in the range of 60 Hz to 8,000 Hz, or from 100 Hz to 4,000 Hz, or any other suitable range.

In some examples, an audio system may include a plurality of acoustic drivers and/or a plurality of microphones, and may include various processing, which may include array processing, to process signals to the acoustic drivers and/or to process signals from the microphones, or a sub-set of either the acoustic drivers or microphones, as appropriate for various applications and/or changing operational requirements.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), micro-controller (s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of reducing echo content of an audio signal, comprising:
   receiving an audio program content signal;
   receiving a sound stage rendering parameter;
   selecting a set of echo filter coefficients, from among a plurality of stored sets of echo filter coefficients, based upon the sound stage rendering parameter;
   filtering the audio program content signal, using the selected set of echo filter coefficients, to generate an estimated echo signal;
   receiving a microphone signal, configured to include a signal component representative of an echo of the audio program content signal; and
   subtracting the estimated echo signal from the microphone signal to generate an output audio signal.

2. The method of claim 1 further comprising loading the selected set of echo filter coefficients to an audio filter and activating the audio filter to perform the filtering.

3. The method of claim 1 further comprising rendering the audio program content signal into an acoustic signal, based upon the sound stage rendering parameter.

4. The method of claim 1 further comprising loading the selected set of echo filter coefficients to an adaptive filter, adapting adaptive filter coefficients, and copying the adaptive filter coefficients to an active audio filter that performs the filtering.

5. The method of claim 1 further comprising loading the selected set of echo filter coefficients to an adaptive filter, the adaptive filter performing the filtering.

6. The method of claim 5 further comprising detecting double-talk and disabling an adaptive component of the adaptive filter while double-talk is detected.

7. The method of claim 1 further comprising storing adapted filter coefficients and associating the stored filter coefficients with the sound stage rendering parameter.

8. The method of claim 1 further comprising receiving a second sound stage rendering parameter, selecting a second set of echo filter coefficients based upon the second sound stage rendering parameter, and filtering the audio program content signal using the second selected set of echo filter coefficients to generate the estimated echo signal.

9. An audio system comprising:
   an input to receive an audio content signal;
   a loudspeaker output configured to provide a processed version of the audio content signal to a loudspeaker for rendering an acoustic signal in accord with a selected sound stage configuration;
   a microphone input to receive a microphone signal having an echo component of the acoustic content signal, from one or more microphones;
   an audio filter configured to filter the audio content signal and to provide an estimated echo signal according to a set of filter coefficients, the set of filter coefficients selected from among a plurality of sets of filter coefficients based upon the selected sound stage configuration; and
   a memory configured to store the plurality of sets of filter coefficients.

10. The audio system of claim 9 further comprising a combiner configured to subtract the filtered audio content signal from the microphone signal to provide an output signal.

11. The audio system of claim 9 further comprising a processor configured to select the selected set of filter coefficients and to copy the selected set of filter coefficients from the memory to the audio filter.

12. The audio system of claim 9 further comprising an adaptive filter to filter the audio content signal according to the set of filter coefficients and to provide an updated set of filter coefficients.

13. The audio system of claim 9 further comprising a processing block configured to determine whether an updated set of filter coefficients performs better than the selected set of filter coefficients, and to copy the updated set of filter coefficients to at least one of the audio filter and the memory.

14. The audio system of claim 9 further comprising a processing block configured to copy a set of filter coefficients from the audio filter to the memory and to associate the copied filter coefficients with the selected sound stage configuration.

15. The audio system of claim 9 further comprising a processing block configured to select a second set of filter coefficients and to copy the second selected set of filter coefficients from the memory to the audio filter in response to a second selected sound stage configuration.

16. A multi-channel audio system comprising:
  a sound stage processor having one or more outputs configured to provide processed signals;
  a plurality of content channels, each of the plurality of content channels configured to convey a selected audio content signal from a source to the sound stage processor; and
  a plurality of echo canceling filters, each of the echo canceling filters associated with one of the plurality of content channels, and each of the echo canceling filters configured to filter an associated selected audio content signal into an estimated echo signal using a set of filter coefficients selected from among a plurality of sets of filter coefficients, the selected set of filter coefficients based upon a selected sound stage configuration associated with the selected audio content signal.

17. The multi-channel audio system of claim 16 further comprising one or more loudspeakers coupled to the one or more outputs to receive the processed signals and to produce acoustic signals responsive to the processed signals.

18. The multi-channel audio system of claim 16 further comprising a microphone input to receive a microphone signal and a signal combiner configured to subtract the plurality of estimated echo signals from the microphone signal.

19. The multi-channel audio system of claim 16 further comprising one or more microphones to receive acoustic signals and configured to provide at least one microphone signal from which the plurality of estimated echo signals is subtracted to produce an output signal.

20. The multi-channel audio system of claim 16 further comprising a memory to store the plurality of sets of filter coefficients.

* * * * *

UNITED STATES PATENT AND TRADEMARK OFFICE
CERTIFICATE OF CORRECTION

PATENT NO. : 10,200,540 B1
APPLICATION NO. : 15/667988
DATED : February 5, 2019
INVENTOR(S) : Cristian M. Hera et al.

Page 1 of 1

It is certified that error appears in the above-identified patent and that said Letters Patent is hereby corrected as shown below:

In the Specification

Column 9, Line 18, delete "214$a$" and insert -- 244$a$ --.
Column 9, Line 19, delete "214$b$" and insert -- 244$b$ --.

Signed and Sealed this
Ninth Day of April, 2019

Andrei Iancu
*Director of the United States Patent and Trademark Office*